US011286089B2

(12) United States Patent
Pinelli et al.

(10) Patent No.: US 11,286,089 B2
(45) Date of Patent: Mar. 29, 2022

(54) FOOD CONTAINER SYSTEM

(71) Applicant: LEAPFROG PRODUCT DEVELOPMENT LLC, Chicago, IL (US)

(72) Inventors: Steven N. Pinelli, Ogden Dunes, IN (US); Kurtis M. Sward, Anna Maria, FL (US); Richard E. Ellison, Chicago, IL (US); Jill Pearson, Oak Park, IL (US); Micaela K. McCabe, Chicago, IL (US); Glen C. Gilmore, III, Naperville, IL (US); Brian M. Clemens, Burnsville, MN (US); Jaswanth Chowdary Gonuguntla, Anantapur (IN); Derek J. Leatzow, Chicago, IL (US); Jordan Sward, Chicago, IL (US)

(73) Assignee: Leapfrog Product Development LLC, Chicago, IL (US)

( * ) Notice: Subject to any disclaimer, the term of this patent is extended or adjusted under 35 U.S.C. 154(b) by 403 days.

(21) Appl. No.: 16/394,793

(22) Filed: Apr. 25, 2019

(65) Prior Publication Data

US 2020/0339310 A1 Oct. 29, 2020

(51) Int. Cl.
*B65D 43/26* (2006.01)
*B65D 43/02* (2006.01)
*B65D 81/03* (2006.01)

(52) U.S. Cl.
CPC ....... *B65D 43/267* (2013.01); *B65D 43/0212* (2013.01); *B65D 81/03* (2013.01); *B65D 2543/0087* (2013.01); *B65D 2543/00101* (2013.01); *B65D 2543/00296* (2013.01); *B65D 2543/00972* (2013.01)

(58) Field of Classification Search
CPC .. B65D 43/267; B65D 43/0212; B65D 81/03; B65D 2543/00101; B65D 2543/00296; B65D 2543/0087; B65D 2543/00972
See application file for complete search history.

(56) References Cited

U.S. PATENT DOCUMENTS 6,793,096 B1 * 9/2004 Seok .................. B65D 43/0218
220/326
8,579,133 B2 11/2013 Marcus et al.
(Continued)

OTHER PUBLICATIONS

Glasslock Product (2 pages).
(Continued)

*Primary Examiner* — Steven A. Reynolds
*Assistant Examiner* — Javier A Pagan
(74) *Attorney, Agent, or Firm* — Barnes & Thornburg LLP

(57) ABSTRACT

A food container system includes a container, a lid and an elastic sleeve. The container has a cavity defined by sidewalls and a bottom. The container also has a shoulder with an undercut around a perimeter of the container. The lid has a central portion, an exterior border, and a plurality of receivers having openings and a tab. Each of the tabs have first and second pivot members that are pivotally retained in the openings in the receivers to allow the tabs to be pivoted between an open position and a locked position. The tabs have a flange with a protrusion that engages the undercut to secure the lid to the container in the locked position. The elastic sleeve is secured around the container to protect the container.

19 Claims, 9 Drawing Sheets

(56) References Cited

U.S. PATENT DOCUMENTS

| | | | | |
|---|---|---|---|---|
| 8,746,487 | B1* | 6/2014 | Joy | ........................ A47J 47/00 |
| | | | | 220/315 |
| 8,978,906 | B2 | 3/2015 | Feeley et al. | |
| 9,266,643 | B2 | 2/2016 | Marcus et al. | |
| 10,173,826 | B2* | 1/2019 | Sexton | ................... B65D 45/18 |
| 2009/0057257 | A1* | 3/2009 | Marcus | ................. B65D 25/20 |
| | | | | 215/11.6 |

OTHER PUBLICATIONS

Pyrex Snapware Product (5 pages).
Rubbermaid Tritan Container (5 pages).
Sistema Container (3 pages).

* cited by examiner

FOOD CONTAINER SYSTEM

FEDERALLY SPONSORED RESEARCH OR DEVELOPMENT

Not Applicable.

TECHNICAL FIELD

The present disclosure relates generally to food containers, and more specifically to a food container system having a container, a removable and resealable lid and a protective wrap.

BACKGROUND

Food containers are well known in the art. While such food containers according to the prior art provide a number of advantages, they nevertheless have certain limitations. The present disclosure seeks to overcome certain of those limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology relates to a food container system. The food container system has a lid with pivotable tabs that are pivotable between an open position and a locked position to secure the lid to the container.

The disclosed technology further relates to a food container system, comprising: a glass container having a first wall, a second wall opposing the first wall, a third wall joining a first end of the first wall and a first end of the second wall, and a fourth wall joining a second end of the first wall and a second end of the second wall, the fourth wall opposing the third wall, a bottom wall joining the first wall, second wall, third wall and fourth wall, wherein the first wall, second wall, third wall, fourth wall and bottom wall define a cavity of the glass container, the glass container further having a shoulder adjacent a perimeter of a top of the glass container opposite the bottom wall, wherein the shoulder has an undercut; a lid having a generally planar central portion and an exterior border, the lid further having a recess interior of its perimeter, and the lid having a plurality of receivers in the exterior border, the plurality of receivers each having openings and a stop; a gasket positioned within the recess in the lid; a separate tab for each of the plurality of receivers, each of the tabs having first and second pivot members extending therefrom that are pivotally retained in the openings in the respective receivers to allow the tabs to be independently pivoted between a first open position and a second locked position, a flange extending from each of the tabs, the flanges having a protrusion that engages the undercut of the shoulder of the glass container to secure the lid to the glass container when the tabs are in the second locked position, and each of the tabs having a wall that engages the stop of the respective plurality of receivers when the tabs are transitioned to the first open position, the stop preventing further pivoting movement of the tabs; and, a removable elastic protective sleeve engaging an exterior of the glass container, the removable elastic protective sleeve having a plurality of sidewalls engaging the first wall, second wall, third wall and fourth wall, respectively, of the glass container, and a footer extending from the plurality of sidewalls, the footer protecting the bottom wall of the glass container.

The disclosed technology further relates to a food container system, comprising: a glass container having a first wall, a second wall opposing the first wall, third wall joining a first end of the first wall and a first end of the second wall, and a fourth wall joining a second end of the first wall and a second end of the second wall, the fourth wall opposing the third wall, a bottom wall joining the first wall, second wall, third wall and fourth wall, wherein the first wall, second wall, third wall, fourth wall and bottom wall define a cavity of the glass container, the container further having a shoulder around a perimeter of a top of the glass container opposite the bottom wall, wherein the shoulder has an undercut; a lid having a central portion and an exterior border, the lid further having a plurality of receivers, each of the receivers having openings; a plurality of tabs for the plurality of receivers, each of the plurality of tabs having first and second pivot members extending therefrom that are pivotally retained in the openings in the respective plurality of receivers to allow the plurality of tabs to be independently pivoted between a first open position and a second locked position, a flange extending from each of the plurality of tabs, the flanges having a protrusion that engages the undercut of the shoulder of the glass container to secure the lid to the glass container when the plurality of tabs are in the second locked position; and, a removable silicone protective sleeve engaging an exterior of the glass container, the removable silicone protective sleeve having a plurality of sidewalls engaging the first wall, second wall, third wall and fourth wall, respectively, of the glass container, and a footer extending from the plurality of sidewalls, the footer protecting the bottom wall of the glass container.

The disclosed technology further relates to a food container system, comprising: a container having a first wall, a second wall opposing the first wall, third wall joining a first end of the first wall and a first end of the second wall, and a fourth wall joining a second end of the first wall and a second end of the second wall, the fourth wall opposing the third wall, a bottom wall joining the first wall, second wall, third wall and fourth wall, wherein the first wall, second wall, third wall, fourth wall and bottom wall define a cavity of the container, the container further having a shoulder around a perimeter of a top of the container opposite the bottom wall, wherein the shoulder has an undercut; a lid having a generally planar central portion and an exterior border, the lid having a recess interior of its perimeter, and the lid having further having a plurality of receivers in the exterior border, the plurality of receivers each having openings and a stop; a gasket positioned within the recess in the lid; and, a plurality of tabs for the plurality of receivers, each of the plurality of tabs having first and second pivot members extending therefrom that are pivotally retained in the openings in the respective plurality of receivers to allow the plurality of tabs to be independently pivoted between a first open position and a second locked position, a flange extending from each of the plurality of tabs, the flanges having a protrusion that engages the undercut of the shoulder of the container to secure the lid to the container when the plurality of tabs are in the second locked position.

The disclosed technology further relates to a food container system wherein the lid has a downwardly extending wall. In one embodiment, the downwardly extending wall of the lid being exterior of the shoulder of the container to assist in seating the lid on the container. In an alternate embodiment, the downwardly extending wall is provided between the plurality of receivers.

The disclosed technology further relates to a food container system wherein a rib extends from the container about the perimeter of the container, the rib engaging the gasket when the lid is secured to the container.

The disclosed technology further relates to a food container system wherein an inner surface of the removable elastic protective sleeve is a polished surface.

The disclosed technology further relates to a food container system wherein the plurality of sidewalls of the removable elastic protective sleeve have a plurality of openings therethrough to allow contents within the cavity of the container to be visible through the removable elastic protective sleeve.

The disclosed technology further relates to a food container system wherein the plurality of sidewalls of the removable elastic protective sleeve have a cutout adjacent a top of the sidewalls to provide clearance for the tabs when securing the lid to the container.

The disclosed technology further relates to a food container system wherein the protective sleeve has an opening in a bottom of the protective sleeve interior of the footer.

The disclosed technology further relates to a food container system wherein the lid is made of a clear plastic to allow the contents within the cavity of the container to be visible through the lid.

The disclosed technology further relates to a food container system wherein the plurality of receivers each has a stop, and wherein each of the plurality of tabs each have a wall that engages the stop of the respective plurality of receivers when the respective plurality of tabs is transitioned to the first open position, the stop preventing further pivoting movement of the respective plurality of tabs.

The disclosed technology further relates to a food container system wherein the lid has a recess interior of its perimeter, and wherein a gasket is positioned within the recess in the lid.

The disclosed technology further relates to a food container system wherein the pivot members comprise shafts at opposing ends of each tab. In one embodiment, the shafts of each of the tabs have a chamfered end.

It is understood that other configurations and embodiments of the subject technology will become readily apparent to those skilled in the art from the following detailed description, wherein various configurations of the subject technology are shown and described by way of illustration. As will be realized, the subject technology is capable of other and different configurations, and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure.

Figure 1:
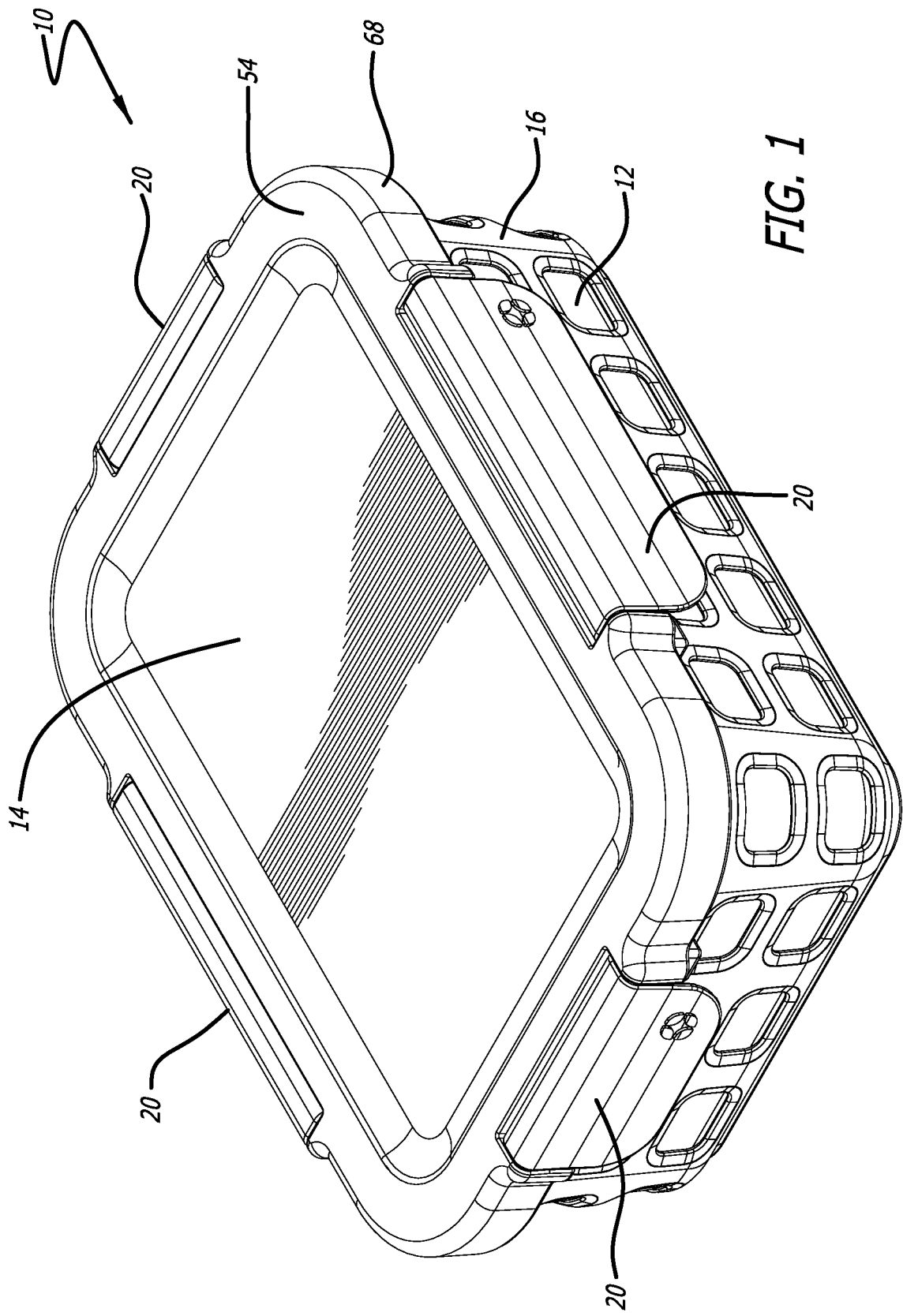
FIG. 1 is a top perspective view of a food container system according to one embodiment.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While the food container system discussed herein is susceptible of embodiments in many different forms, there is shown in the drawings, and will herein be described in detail, preferred embodiments with the understanding that the present description is to be considered as an exemplification of the principles of the wagon and foldable trailer and are not intended to limit the broad aspects of the disclosure to the embodiments illustrated. Thus, the detailed description set forth below is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Figure 2:
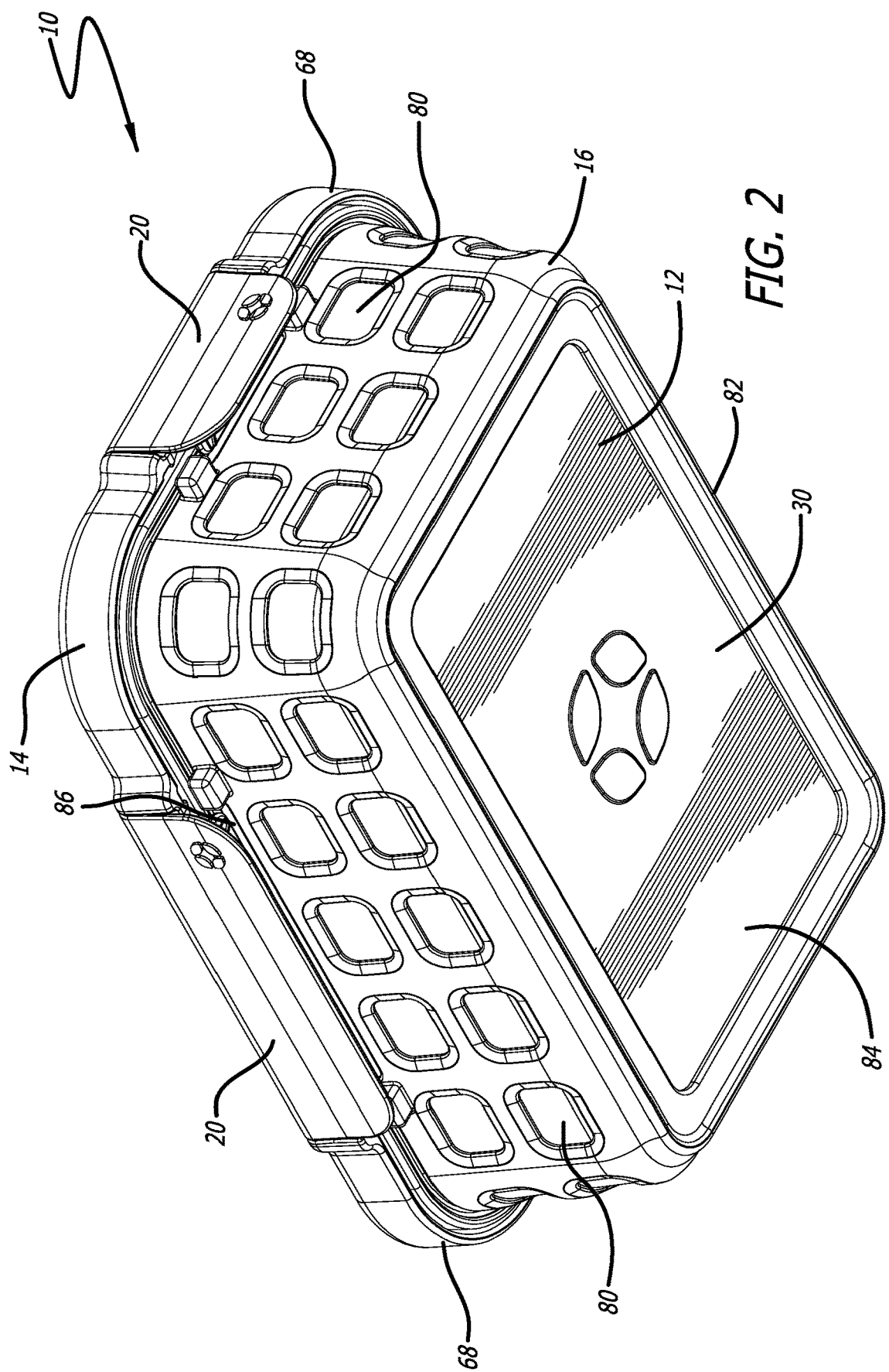
FIG. 2 is a bottom perspective view of the food container system of FIG. 1.
Figure 3:
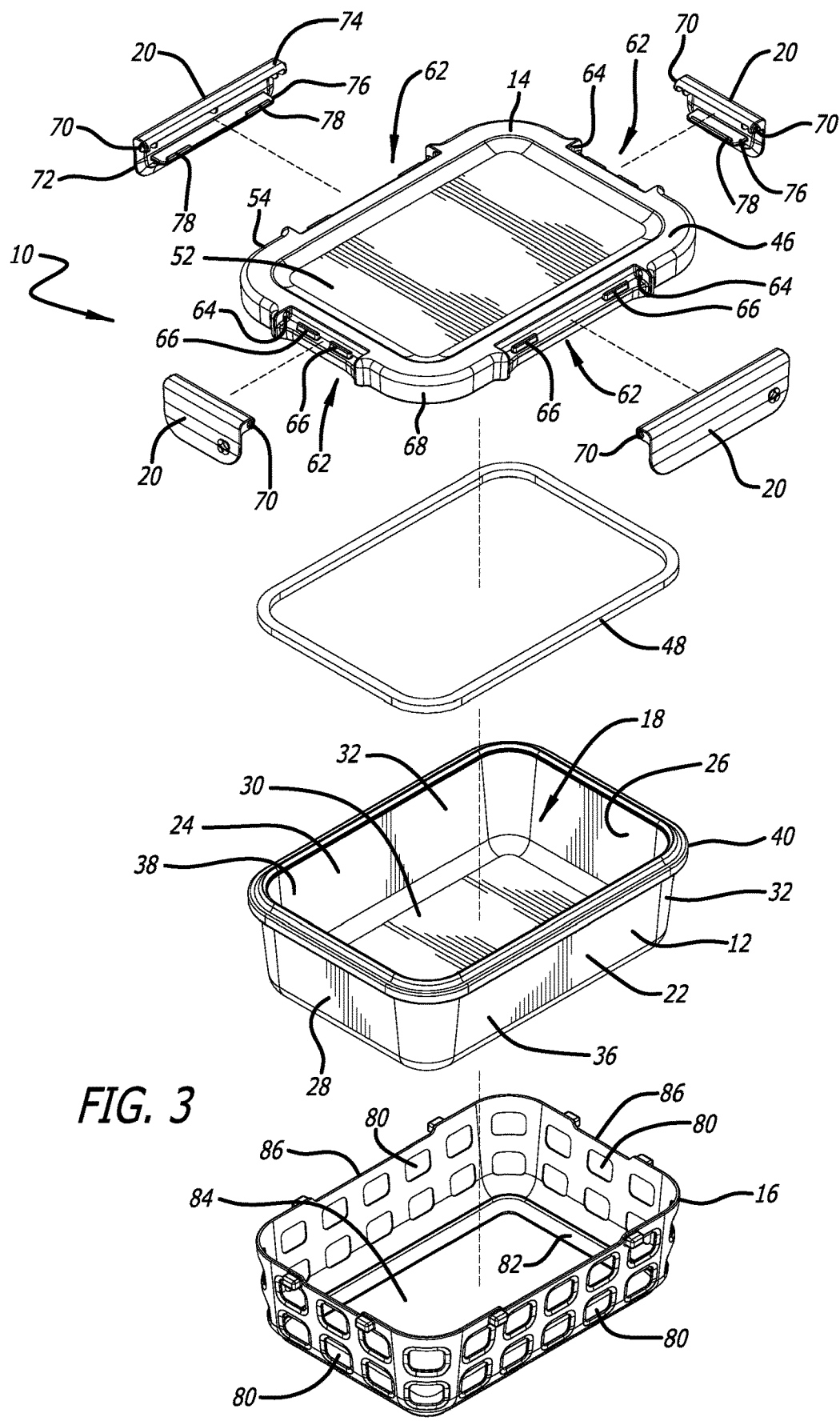
FIG. 3 is an exploded perspective view of the food container system of FIG. 1.
Figure 7:
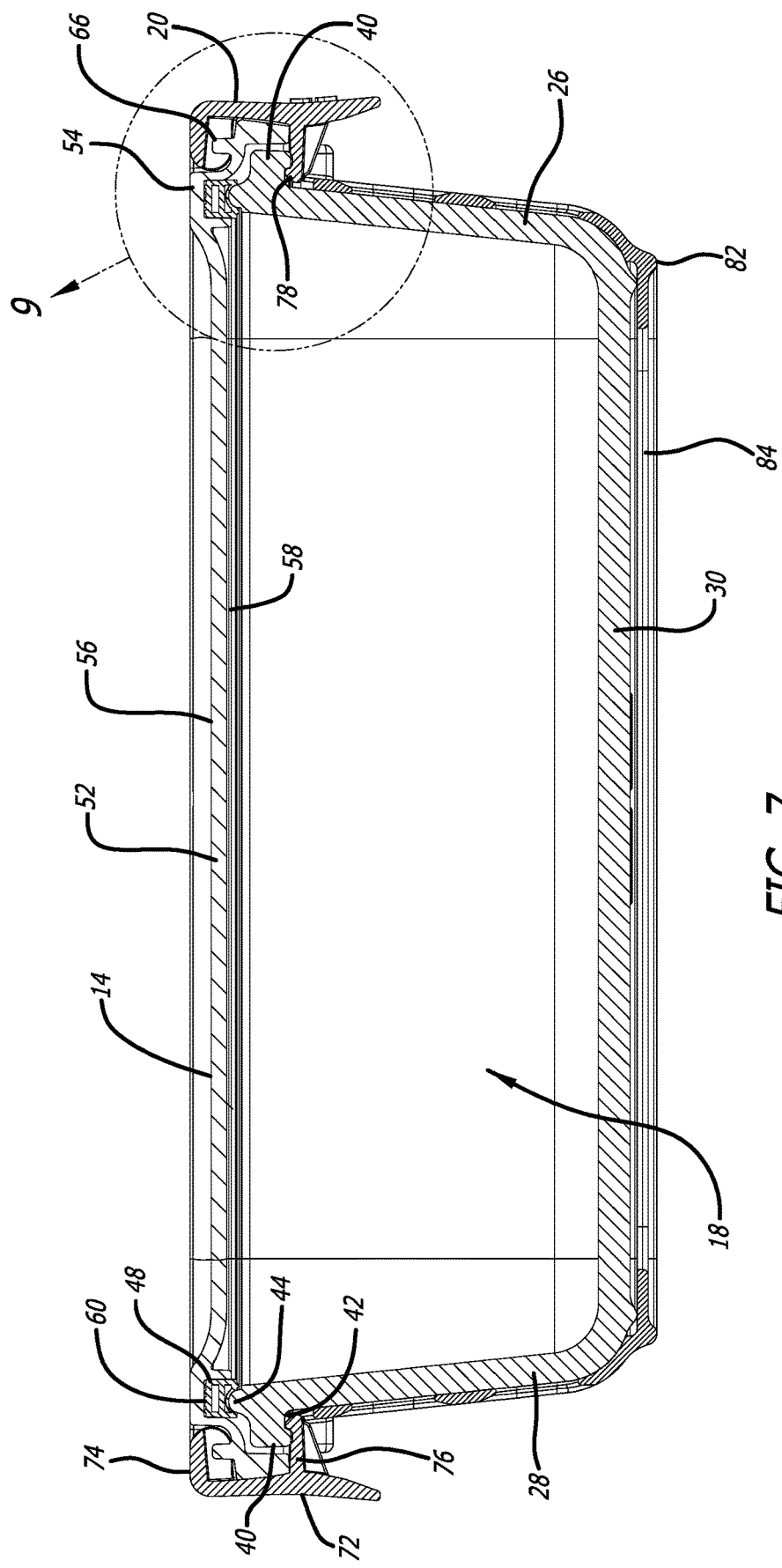
FIG. 7 is a cross-sectional side view of the food container system of FIG. 1 about line 7-7 of FIG. 5.
Figure 8:
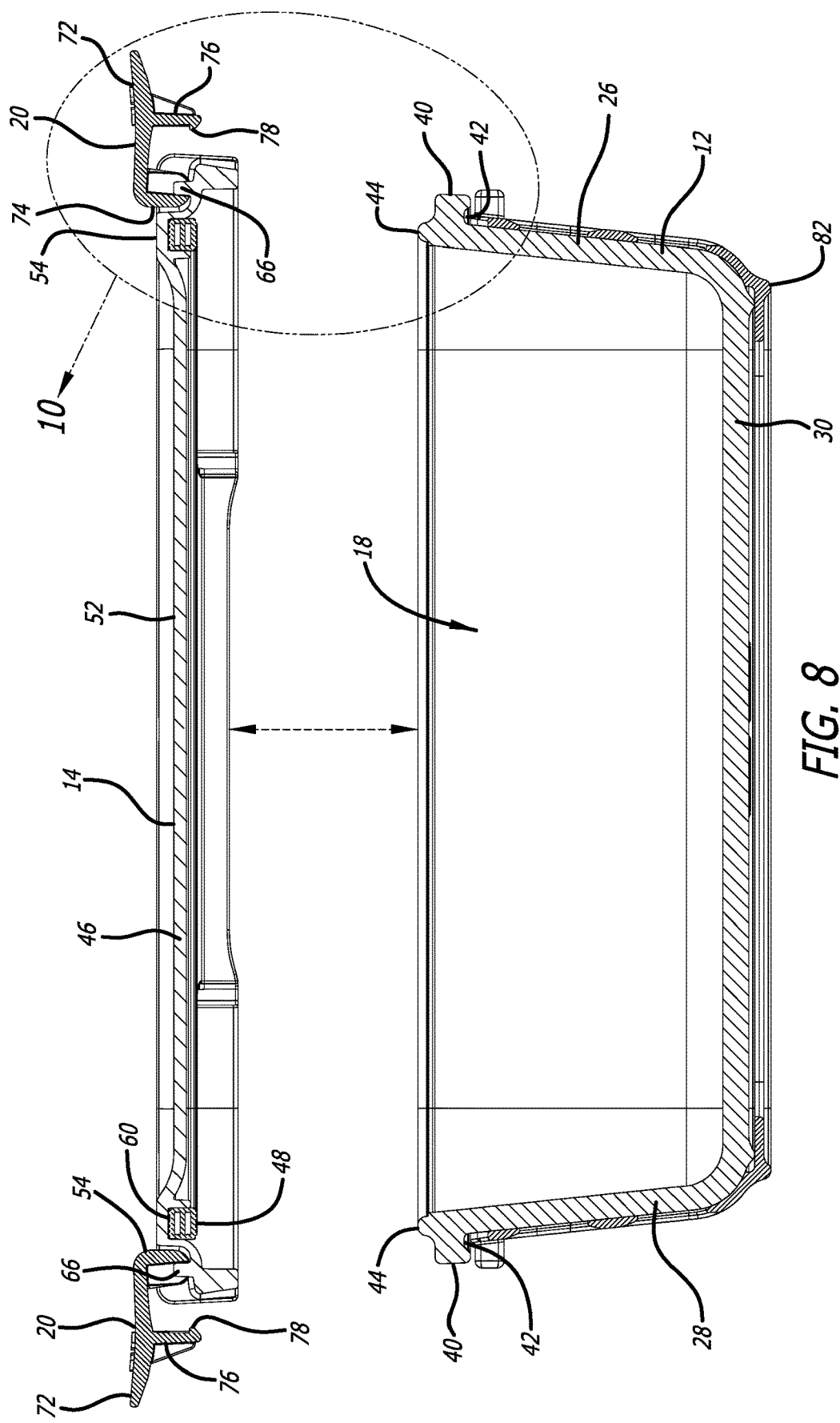
FIG. 8 is a partial exploded cross-sectional side view of the food container system of FIG. 7, with the lid removed from the container.

Referring now to the figures, and initially to FIGS. 1-3, a food container system 10 is illustrated. In various embodiments the food container system 10 includes a container 12, a lid 14 and a protective sleeve 16. The container 12 has a cavity 18 therein into which food can be placed for storage and cooking. The lid 14 has tabs 20 that are pivotable between an open position, as shown in FIG. 8, and a closed position, as shown in FIG. 7. In the closed position the tabs 20 operate to lock the lid 14 to the container 12 to provide an air-tight seal for food within the cavity 18 of the container 12.

The container 12 is generally used to store and/or cook food. Accordingly, in a preferred embodiment the container 12 is preferably able to be placed in the oven for cooking and in the dishwasher for washing. In one embodiment, the container 12 comprises a glass enclosure, however, the container 12 may be comprised of alternative materials in alternate embodiments. Having a glass container 12 allows for the user to see the contents within the cavity 18 of the container 12 even when the lid 14 is secured to the container 12. In one embodiment, as best shown in FIG. 3, the container 12 has a plurality of sidewalls 22, 24, 26, 28 and a bottom wall 30. The sidewalls 22, 24, 26, 28 and bottom wall 30 define the cavity 18 of the container 12. With reference to FIG. 3, in one embodiment the container 12 has a first wall 22, a second wall 24 opposing the first wall 22, a third wall 26 joining a first end 32 of the first wall 22 and a first end 34 of the second wall 24, and a fourth wall 28 joining a second end 36 of the first wall 22 and a second end 38 of the second wall 24. The fourth wall 28 opposes the third wall 26. The bottom wall 30 joins a bottom of the first wall 22, second wall 24, third wall 26 and fourth wall 28. Further, in one embodiment, the first wall 22, second wall 24, third wall 26, fourth wall 28 and bottom wall 30 define the cavity 18 of the container 12.

Figure 9:
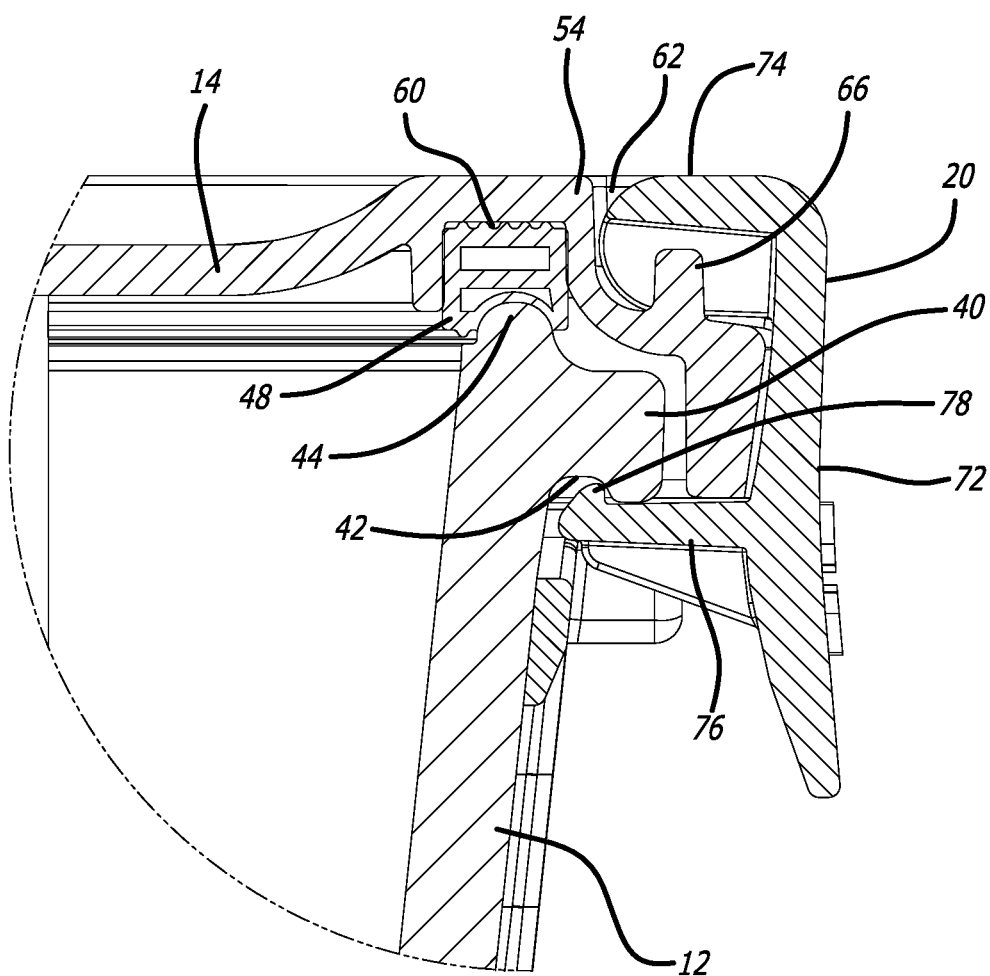
FIG. 9 is an enlarged partial cross-sectional view of the closure mechanism of the food container system as referenced in FIG. 7, with the closure mechanism in the closed position.

As shown in FIGS. 7-9, in one embodiment, the container 12 further has a shoulder 40 adjacent a perimeter of a top of the container 12 opposite the bottom wall 30. In a preferred embodiment, the shoulder 40 extends outwardly from the sidewalls 22, 24, 26, 28 of the container 12. Additionally, in a most preferred embodiment the shoulder 40 has an undercut 42. The undercut 42 may be provided in the central regions of each sidewall, preferably adjacent the tabs 20 of the lid 14 when the lid 14 is positioned on the container 12, or the undercut 42 may be provided about the entire shoulder 40.

In one embodiment, as best shown in FIGS. 7-9, the container 12 also has a rib 44 extending about the perimeter of the container 12. The rib 44 may extend upwardly adjacent the shoulder 40 of the container 12. In a preferred embodiment, the rib 44 is continuous about the entire perimeter, or adjacent the entire perimeter, of the container 12. The rib 44, as explained below, engages a seal or gasket on the lid 14 when the lid 14 is secured to the container 12 to assist in providing an air-tight seal for food within the cavity 18 of the container 12.

Referring to FIGS. 1-10, the food container system 10 includes a lid 14. The lid 14 is secured to the container 12 to preferably provide an air-tight seal for food within the cavity 18 of the container 12. In one embodiment, the lid 14 comprises a lid housing 46, a gasket 48 and a plurality of locking tabs 20. In this application, the lid 14 may refer to the system of parts making up the lid assembly, such as the lid housing 46, the gasket 48 and the locking tabs 20, or the lid 14 may simply refer to the lid housing 46.

In one embodiment, the lid 14 comprises a generally planar central portion 52 and an exterior border 54. In one embodiment the central portion 52 and the exterior border 54 are integral, however, in alternate embodiments the central portion 52 of the lid 14 and the exterior border 54 are not integral components. In a preferred embodiment the lid 14 is made of a clear plastic to allow the contents within the cavity 18 of the container 12 to be visible through the central portion 52 when the lid 14 is secured to the container 12. The lid 14 has a upper surface 56 and a lower surface 58.

Figure 4:
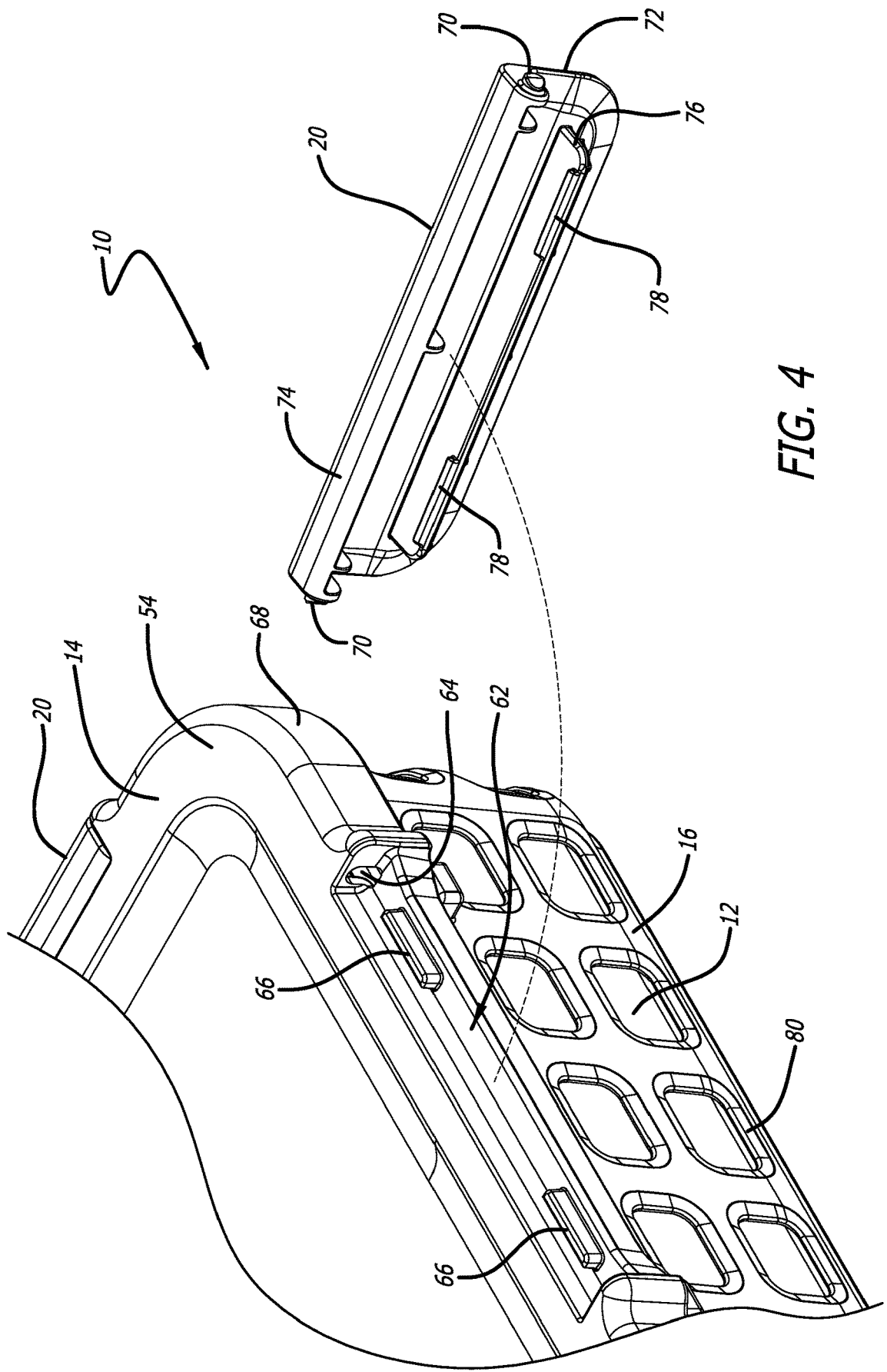
FIG. 4 is a partial exploded perspective view of the food container system of FIG. 1, with a snap flap removed.
Figure 5:
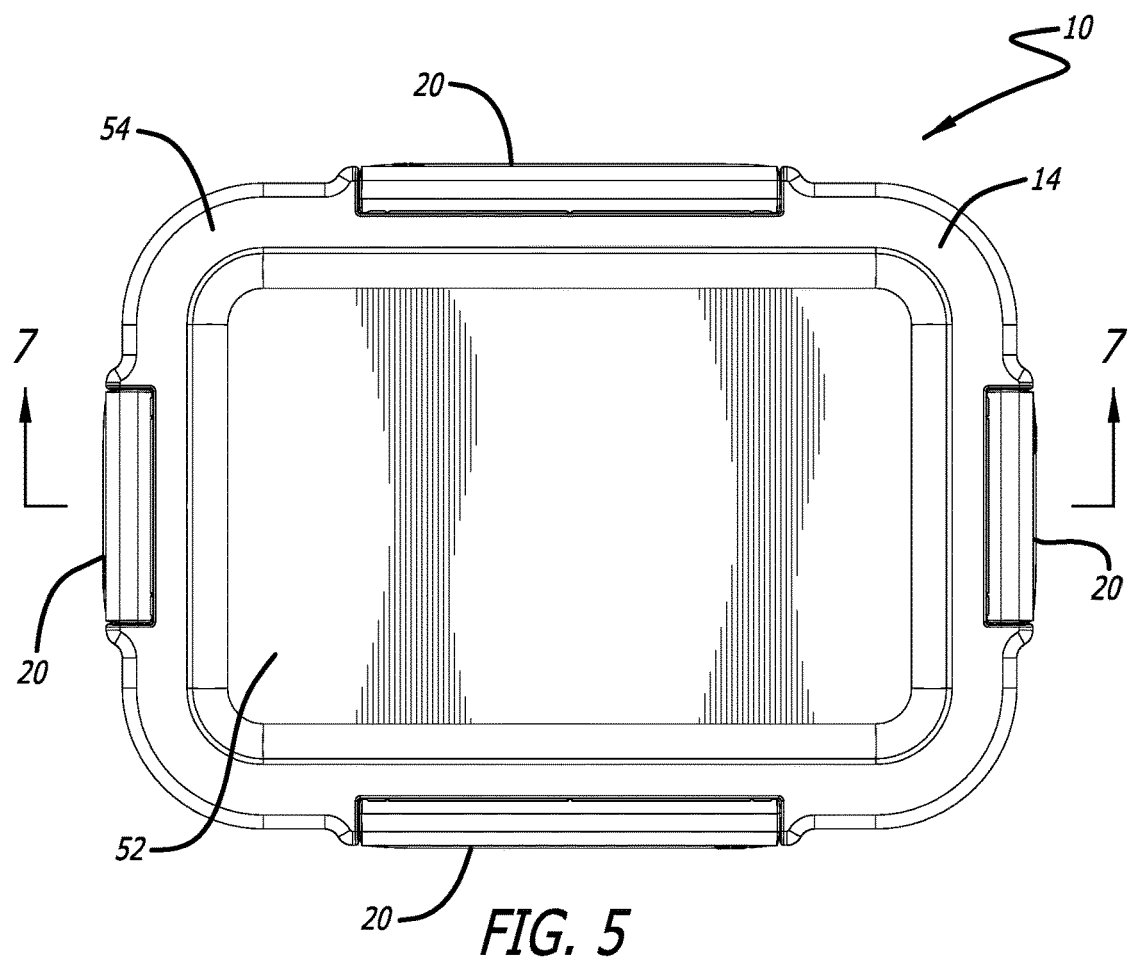
FIG. 5 is a top plan view of the food container system of FIG. 1.
Figure 6:
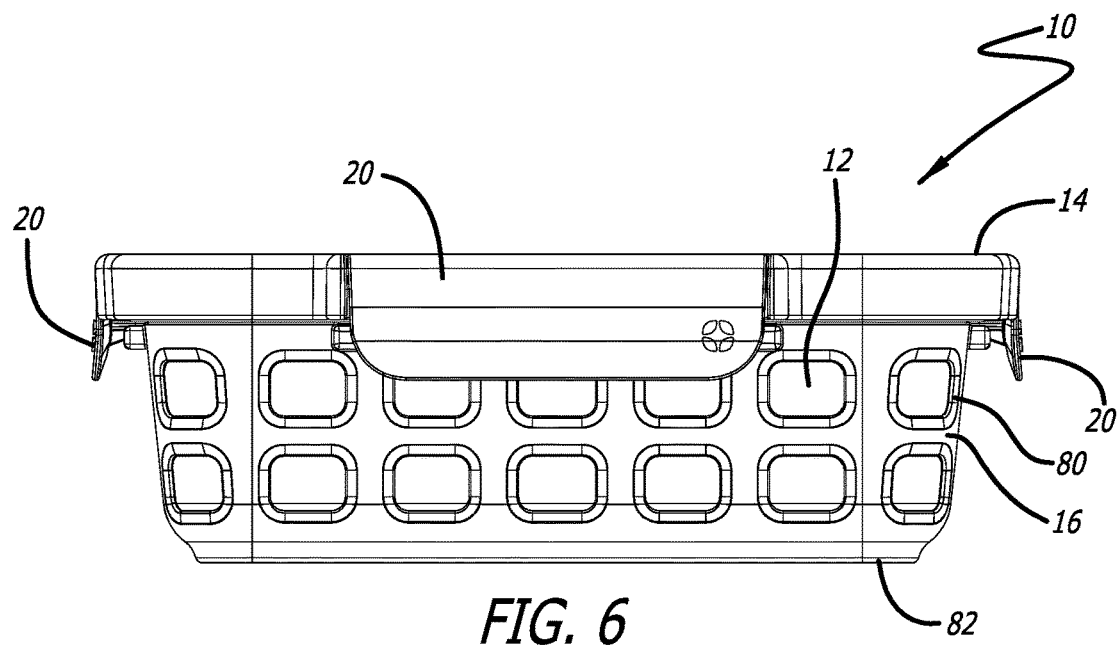
FIG. 6 is a side elevation view of the food container system of FIG. 1.

As shown in FIGS. 7-10, in one embodiment, the lid 14 has a recess 60 in its lower surface 58, the recess 60 being interior of its perimeter. The recess 60 may comprise a groove in which the gasket 48 resides. As shown in FIGS. 3 and 4, the lid 14 also preferably has a plurality of receivers 62 in the exterior border 54 for receiving the locking tabs 20. In one embodiment, the receivers 62 are indentations in the exterior border 54 of the lid 14. As best shown in FIG. 4, the receivers 62 each have openings 64 and stops 66. Preferably each receiver 62 has two openings 64 and one or more stops 66. The openings 64 preferably extend into the exterior border 54, and the stops 66 preferably extend from the receivers 62 of the exterior border 54. In one embodiment, the stops 66 are spaced a distance from a rear wall of the receivers 62.

Referring to FIGS. 1, 2, 4, 8 and 10, the lid 14 also preferably has a downwardly extending wall 68. In one embodiment, the downwardly extending wall 68 helps to position the lid 14 on the container 12. Specifically, when the lid 14 is placed on the container 12, the downwardly extending wall 68 fits around an exterior of the shoulder 40 of the container 12, thereby properly assisting in properly seating and positioning the lid 14 on the container 12. In one embodiment, the downwardly extending wall 68 is provided between the receivers 62.

Figure 10:
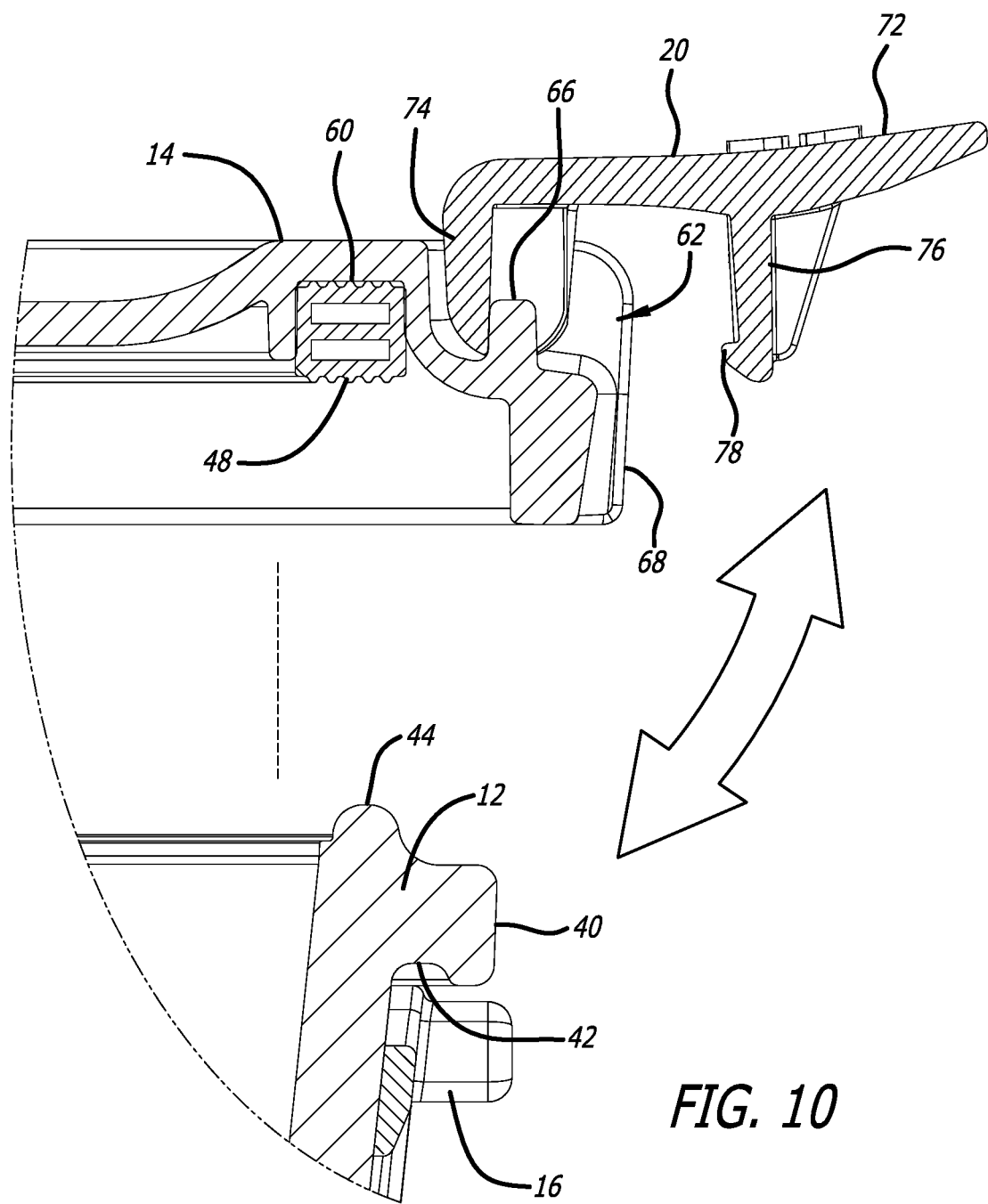
FIG. 10 is an enlarged partial cross-sectional view of the closure mechanism of the food container system as referenced in FIG. 8, with the closure mechanism in the open position.

As explained above, each of the plurality of receivers 62 preferably houses a separate locking tab 20. As shown in FIG. 4, the locking tabs 20 have first and second pivot members 70 extending from the tabs 20. The first and second pivot members 70 are pivotally retained in the openings 64 in the receivers 62 of the lid 14 and are able to pivot within the openings 64 of the receivers 62 to allow each of the tabs 20 to be independently pivoted between a first open position (as shown in FIGS. 8 and 10), and a second locked position (as shown in FIGS. 1, 2, 7 and 9). In one embodiment the pivot members 70 comprise shafts 70 at opposing ends of each of the tabs 20. Additionally, as shown in FIG. 4, the shafts 70 may have a chamfered end to assist in seating the tabs 20 with the shafts 70 into the openings 64 of the receivers 62.

In one embodiment, as best shown in FIGS. 4 and 9, the tabs 20 have an "F" shape, comprised of a sidewall 72, a back wall 74 extending from a top of the sidewall 72, and a flange 76 extending generally from a mid-portion of the sidewall 72. Additionally, in one embodiment the pivot members 70 extend from opposing end walls 74 of the tabs 20. In one embodiment, when the tabs 20 are in the locked position, as shown in FIGS. 1, 7 and 9, the back wall 74 of the tabs 20 is generally parallel with a top surface of the exterior border 54 of the lid 14. When the tabs 20 are pivoted approximately 90° to the fully open position, as shown in FIGS. 8 and 10, the back wall 74 of the tabs 20 hit the stops 66, thereby preventing further pivoting movement of the tabs 20. In the fully open position the back wall 74 of the tabs 20 is orientated in generally the vertical position as shown in FIG. 10. The flange 76 extending inwardly from the sidewall 72 has a protrusion 78 toward an end thereof. As best shown in FIGS. 7 and 9, when the lid 14 is positioned on the container 12 and the tabs 20 are pivoted to the second locked position, the protrusion 78 of the flange 76 of the tabs 20 engages the undercut 42 in the shoulder 40 of the container 12 to secure the tab 20, and thereby the lid 14, to the container 12. Additionally, when the tabs 20 are rotated to the second locked position and the protrusion 78 of the flange 76 engages the undercut 42 in the shoulder 40 of the container 12, the rib 44 of the container will engage and push against the seal or gasket on the lid 14 to seal the cavity of the container 12. Preferably, as shown in FIGS. 1, 2, 3 and 5, the lid 14 has four tabs 20 spaced adjacent and engaging, respective, undercuts 42 in the shoulder 40 adjacent the first, second, third and fourth side walls 22, 24, 26 and 28 of the container 12.

The container system 10 preferably also includes a removable protective sleeve 16. In a preferred embodiment the protective sleeve 16 is an elastic member, and most preferably it is made of a silicone material so that it does not have to be removed from the container 12 when food is cooked in the container 12. The removable protective sleeve 16 engages an exterior of the container 12, and preferably the removable protective sleeve 16 has a plurality of sidewalls that engage, respectively, the first, second, third and fourth side walls 22, 24, 26, 28 of the container 12. In a preferred embodiment, the sidewalls of the removable protective sleeve 16 have a plurality of openings 80 therethrough so that the contents within the cavity 18 of the container 12 are visible through the protective sleeve 16. As shown in FIGS. 2, 3 and 7, the protective sleeve 16 also has a footer 82 that extends adjacent the bottom wall 30 of the container 12 to protect the bottom of the container 12. And, in one embodiment the protective sleeve 16 has an opening 84 in the bottom of the protective sleeve 16 interior of the footer 82. Further, as shown in FIGS. 2 and 3, the protective sleeve 16 may have cutouts 86 adjacent a top of the sidewalls of the protective sleeve to provide clearance for the tabs 20 when the lid 14 is secured to the container 12.

In one embodiment the inner surface of the protective sleeve 16 comprises a polished surface. The polished inner surface assists to retain the protective sleeve 16 to outer surface of the container 12, especially when the container 12 is made of glass.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A food container system, comprising:
   a glass container having a first wall, a second wall opposing the first wall, a third wall joining a first end of the first wall and a first end of the second wall, and a fourth wall joining a second end of the first wall and a second end of the second wall, the fourth wall opposing the third wall, a bottom wall joining the first wall, second wall, third wall and fourth wall, wherein the first wall, second wall, third wall, fourth wall and bottom wall define a cavity of the glass container, the glass container further having a shoulder extending about an entirety of a perimeter adjacent a top of the glass container opposite the bottom wall, wherein the shoulder has an undercut that extends about the entirety of the perimeter of the glass container;
   a lid having a generally planar central portion and an exterior border, the lid further having a recess interior of its perimeter, and the lid having a plurality of receivers in the exterior border, the plurality of receivers each having openings and a stop;
   a gasket positioned within the recess in the lid;
   a separate tab for each of the plurality of receivers, each of the tabs having first and second pivot members extending therefrom that are pivotally retained in the openings in the respective receivers to allow the tabs to be independently pivoted between a first open position and a second locked position, a flange extending from each of the tabs, the flanges having a protrusion that engages the undercut of the shoulder of the glass container to secure the lid to the glass container when the tabs are in the second locked position, and each of the tabs having a wall that engages the stop of the respective plurality of receivers when the tabs are transitioned to the first open position, the stop preventing further pivoting movement of the tabs; and,
   a removable elastic protective sleeve engaging an exterior of the glass container, the removable elastic protective sleeve having a plurality of sidewalls engaging the first wall, second wall, third wall and fourth wall, respectively, of the glass container, and a footer extending from the plurality of sidewalls, the footer protecting the bottom wall of the glass container.

2. The food container system of claim 1, wherein the lid further has a downwardly extending wall.

3. The food container system of claim 2, wherein the downwardly extending wall is provided between the plurality of receivers.

4. The food container system of claim 2, wherein the downwardly extending wall of the lid is exterior of the shoulder of the glass container to assist in seating the lid on the glass container.

5. The food container system of claim 1, further comprising a rib extending from the glass container about the perimeter of the glass container, the rib engaging the gasket when the lid is secured to the glass container.

6. The food container system of claim 1, wherein an inner surface of the removable elastic protective sleeve is a polished surface.

7. The food container system of claim 1, wherein the plurality of sidewalls of the removable elastic protective sleeve have a plurality of openings therethrough to allow contents within the cavity of the glass container to be visible through the removable elastic protective sleeve.

8. The food container system of claim 1, further comprising an opening in a bottom of the removable elastic protective sleeve interior of the footer.

9. The food container system of claim 1, wherein the lid is made of a clear plastic to allow the contents within the cavity of the glass container to be visible through the lid.

10. The food container system of claim 1, wherein the plurality of sidewalls of the removable elastic protective sleeve have a cutout adjacent a top of the sidewalls to provide clearance for the tabs when securing the lid to the glass container.

11. A food container system, comprising:
    a glass container having a first wall, a second wall opposing the first wall, third wall joining a first end of the first wall and a first end of the second wall, and a fourth wall joining a second end of the first wall and a second end of the second wall, the fourth wall opposing the third wall, a bottom wall joining the first wall, second wall, third wall and fourth wall, wherein the first wall, second wall, third wall, fourth wall and bottom wall define a cavity of the glass container, the container further having a shoulder around a perimeter of a top of the glass container opposite the bottom wall, wherein the shoulder has an undercut;

a lid having a central portion and an exterior border, the lid further having a plurality of receivers, each of the receivers having openings;

a plurality of tabs for the plurality of receivers, each of the plurality of tabs having first and second pivot members extending therefrom that are pivotally retained in the openings in the respective plurality of receivers to allow the plurality of tabs to be independently pivoted between a first open position and a second locked position, a flange extending from each of the plurality of tabs, the flanges having a protrusion that engages the undercut of the shoulder of the glass container to secure the lid to the glass container when the plurality of tabs are in the second locked position; and, a removable silicone protective sleeve engaging an exterior of the glass container, the removable silicone protective sleeve having a plurality of sidewalls engaging the first wall, second wall, third wall and fourth wall, respectively, of the glass container, a bottom wall, and a footer extending from the bottom wall of the protective sleeve, wherein an inner surface of the removable silicone protective sleeve is a polished surface.

12. The food container of claim 11, wherein the plurality of receivers each has a stop, and wherein each of the plurality of tabs each have a wall that engages the stop of the respective plurality of receivers when the respective plurality of tabs is transitioned to the first open position, the stop preventing further pivoting movement of the respective plurality of tabs.

13. The food container of claim 11, wherein the lid has a recess interior of its perimeter, and wherein a gasket is positioned within the recess in the lid.

14. A food container system, comprising:

a container having a first wall, a second wall opposing the first wall, third wall joining a first end of the first wall and a first end of the second wall, and a fourth wall joining a second end of the first wall and a second end of the second wall, the fourth wall opposing the third wall, a bottom wall joining the first wall, second wall, third wall and fourth wall, wherein the first wall, second wall, third wall, fourth wall and bottom wall define a cavity of the container, the container further having a shoulder around an entirety of a perimeter adjacent a top of the container opposite the bottom wall, wherein the shoulder has an undercut that extends about the entirety of the perimeter of the container;

a lid having a generally planar central portion and an exterior border, the lid having a recess interior of its perimeter, and the lid having further having a plurality of receivers in the exterior border, the plurality of receivers each having openings and a stop;

a gasket positioned within the recess in the lid; and, a plurality of tabs for the plurality of receivers, each of the plurality of tabs having first and second pivot members extending therefrom that are pivotally retained in the openings in the respective plurality of receivers to allow the plurality of tabs to be independently pivoted between a first open position and a second locked position, a flange extending from each of the plurality of tabs, the flanges having a protrusion that engages the undercut of the shoulder of the container to secure the lid to the container when the plurality of tabs are in the second locked position.

15. The food container of claim 14, further comprising a removable silicone protective sleeve engaging an exterior of the container, the removable silicone protective sleeve having a plurality of sidewalls engaging the first wall, second wall, third wall and fourth wall, respectively, of the container, a bottom wall, and a footer extending from the bottom wall of the silicone protective sleeve.

16. The food container of claim 15, wherein an inner surface of the removable silicone protective sleeve is a polished surface.

17. The food container of claim 14, wherein the lid further has a downwardly extending wall between the plurality of receivers, the downwardly extending wall of the lid being exterior of the shoulder of the container to assist in seating the lid on the container.

18. The food container of claim 14, wherein the pivot members comprise shafts at opposing ends of each tab.

19. The food container of claim 18, wherein the shafts of each of the tabs have a chamfered end.

* * * * *